United States Patent
Birkler et al.

(10) Patent No.: US 6,529,744 B1
(45) Date of Patent: Mar. 4, 2003

(54) HANDLING MENU INFORMATION

(75) Inventors: Jorgen Birkler, Bara (SE); Lars Novak, Lund (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/490,497

(22) Filed: Jan. 25, 2000

(30) Foreign Application Priority Data

Jan. 26, 1999 (GB) ............................................. 9901703

(51) Int. Cl.⁷ ............................. H04B 7/38; H04M 1/00
(52) U.S. Cl. ....................................... 455/557; 455/420
(58) Field of Search ................................ 455/575, 557, 455/556, 550, 418, 419, 420, 566, 558, 66, 88; 379/357.01

(56) References Cited

U.S. PATENT DOCUMENTS

| | | | |
|---|---|---|---|
| 5,465,401 A | * 11/1995 | Thompson | 379/357.01 |
| 5,754,173 A | 5/1998 | Hiura et al. | 345/333 |
| 6,201,975 B1 | * 3/2001 | Isberg et al. | 455/557 |
| 6,219,560 B1 | * 4/2001 | Erkkila et al. | 455/557 |

FOREIGN PATENT DOCUMENTS

| | | |
|---|---|---|
| EP | 0654927 | 5/1995 |
| EP | 0715441 | 6/1996 |
| EP | 0835013 | 4/1998 |
| GB | 2162393 | 1/1986 |
| WO | WO 92/20167 | 11/1992 |
| WO | WO 98/00993 | 1/1998 |
| WO | WO 98/35517 | 8/1998 |
| WO | WO 99/01972 | 1/1999 |
| WO | WO 99/53621 | 10/1999 |

OTHER PUBLICATIONS

Hall, N., Patents Act 1977: Search Report Under Section 17(5), App. No.GB 9901703.0, Jul. 8, 1999, pp. 1–3.
Fragua, M., International Search Report, App. No. PCT/EP00/00507, Apr. 14, 2000, pp. 1–6.
Halldin, C., International–Type Search Report, Search Request No. SE96/00774, May 12, 1997, pp. 1–3.

* cited by examiner

*Primary Examiner*—Nguyen T. Vo
(74) *Attorney, Agent, or Firm*—Jenkens & Gilchrist, P.C.

(57) ABSTRACT

A base device such as a mobile phone is able to support an interface updating protocol. An accessory is able to operate the same protocol. When the accessory is connected to the base device, the base device user interface can provide the user with an interface which allows him to control operating features of the accessory.

For example, the interface of the base device includes a display, which lists available operating features in a menu structure, and a user input means, for example in the form of a keyboard.

In preferred embodiments of the invention, all menus, relating to the accessory, are stored dynamically within the base device. Thus, there is no permanently available menu structure stored within the base device.

11 Claims, 3 Drawing Sheets

HANDLING MENU INFORMATION

TECHNICAL FIELD OF THE INVENTION

This invention relates to a method of presenting menu information, relating to the operation of an accessory unit which has no user interface, when the accessory unit is used with a base unit. The invention also relates to a base unit and an accessory unit suitable for such use. For example, the base unit may be a mobile phone.

BACKGROUND OF THE INVENTION

Devices such as mobile phones have user interfaces, which allow their users to receive information relating to the status of the device. For example, the user interface may present such information in the form of a menu of available options, which allows the user to scroll through a list of headings, each of which may provide access to a list of sub-headings or available features, eventually selecting a desired feature. Such devices are commonly used with accessory devices which have no user interface.

There is therefore a need for a system which allows a user to select operating features of an accessory device, through a menu structure presented on a user interface of a base device.

Advantageously, the base device should be able to support a range of accessory devices, including accessory devices which have not been conceived of when the base device is designed.

WO98/00993 discloses a method and a device for handling user menu information in a mobile telephone. The mobile telephone stores at least one standard menu. When an accessory is connected to the mobile telephone, it can send a signal selecting a standard menu and including data for adaptation of the standard menu. For example, it may be preferable to include text which identifies the type of accessory in use.

In devices such as mobile telephones, it is a constant concern to minimise the size and weight of the device. This means that it is desirable to minimise the memory usage requirements of such devices. It is therefore desirable to avoid the need to store standard menu structures, as described above with reference to the prior art.

SUMMARY OF THE INVENTION

According to aspects of the invention, there are provided base devices, accessories, and methods of operation of accessories in combination with base devices. A base device is able to support an interface updating protocol. An accessory is able to operate the same protocol. When the accessory is connected to the base device, the base device interface can provide the user with an interface which allows him to control operating features of the accessory.

Preferably, the base device is a mobile phone. Preferably, the interface of the base device includes a display, which lists available operating features in a menu structure, and a user input means, for example in the form of a keyboard.

In preferred embodiments of the invention, all menus, relating to the accessory, are stored dynamically within the base device. Thus, there is no permanently available menu structure stored within the base device. Rather, when an accessory is first connected to a base device, a first menu is sent from the accessory to the base device. The menu is displayed for user selection. When the user has made a selection, a sub-menu may be sent from the accessory to the base device and displayed. When the user has made a selection from the sub-menu, a control signal is returned to the accessory, but information relating to the sub-menu may no longer be stored in the base device.

Advantageously, therefore, all subsequently developed accessories can be made compatible with existing base devices, by incorporation therein of suitable routines in the selected interface updating protocol.

Moreover, the use of dynamic storage of the menu items within the base device means that the requirement for usage of memory within the base device is greatly reduced.

Preferably, communications between the base device and the accessories take place using the well-known AT protocol. This has the advantage that, when the base device is a computing device, such as a hand-held computer, or PDA (personal digital assistant), which will need to be able to support this protocol for other reasons, there will be no additional requirement for protocol support.

Although the AT protocol is known for controlling modems when they are connected to computers, the preferred embodiments of this invention use the AT protocol for controlling accessories other then modems. In particular, although the use of the AT protocol is known in computers for controlling modems, that is a wired accessory which connects the computer to a network, the present invention contemplates the use of the AT protocol in a radio communications device for controlling a non-wired accessory that is an accessory which relates to the radio communications. For example, the non-wired accessory may use or control or be controlled by or retransmit signals transmitted over the radio communications link of the radio communications device.

DETAILED DESCRIPTION OF PREFERRED EMBODIMENTS

Figure 1:
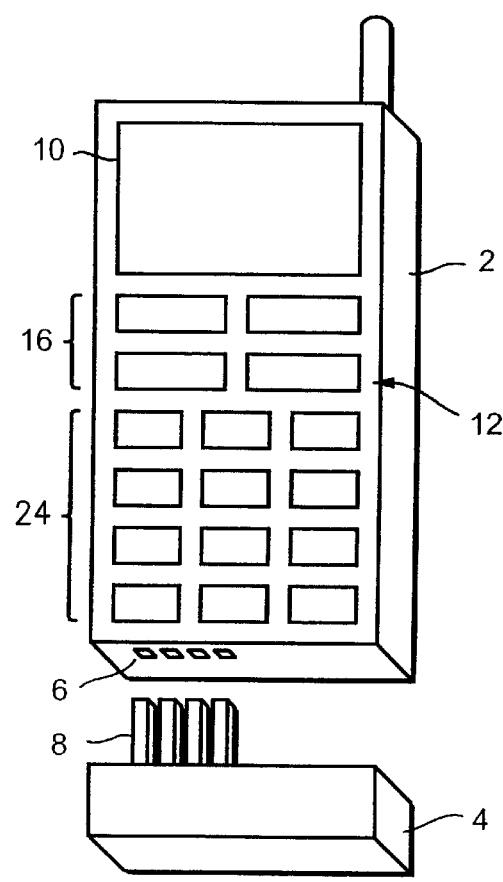
FIG. 1 shows a telephone and accessory in accordance with the invention.
Figure 2:
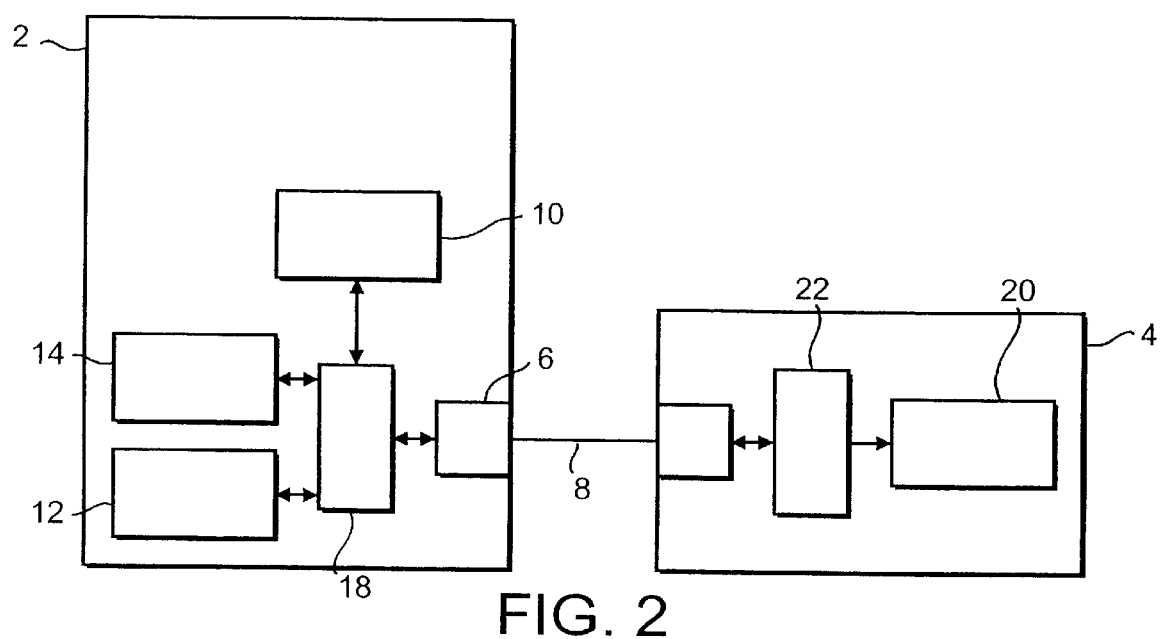
FIG. 2 is a block schematic diagram of the devices of FIG. 1.

FIG. 1 shows a base device, in this case a mobile phone 2, having an accessory, in this case a silent alerter 4, connected thereto, while FIG. 2 is a block schematic diagram of the functional elements of the combination.

It will be appreciated that the illustration of a mobile phone and a silent alerter is only exemplary. The base device can be any device which allows user interaction. For example, it may advantageously be a computing device, such as a PDA (personal digital assistant), palm-top computer, or communicator, with computing and radio communications functions. Further, the accessory could be any device intended to work with the base device, which in use of the invention does not require its own user interface. For example, the accessory could be a FM-radio receiver, a wireless headset, an electronic dictionary/translator, or a device which connects to a radio communications device to act as a web-browser using the Wireless Application Protocol.

Moreover, although there is illustrated only a single accessory, two or more such accessories can be connected at any time.

The phone 2 has a socket 6, while the alerter 4 has a matching plug-in connector 8 which allows it to be connected to the phone.

The phone 2 has a display 10, for example in the form of an LCD, for displaying information to a user. As will be described in more detail below, the displayed information can include a menu of available phone features.

Further, the phone has a keypad 12, by means of which the user can input information to the phone. As is conventional, the keypad 12 includes numeric keys 24 and function keys 16. The function keys 16 allow the user to scroll through items in a menu displayed on the LCD 10, and allow the user to select an item from such a menu for activation.

It will be appreciated that the description of a user interface with a display and a keypad is purely exemplary. For example, the user interface may take the form of a voice synthesizer output and a voice recognition input.

As is conventional, the phone has a memory 14 which stores menu information relating to features of the phone 2. Thus, when a phone is first switched on, a first menu of available functions may be presented to the user. Selection of an item from that list may produce a sub-menu, which may contain specific features and/or further sub-menu headings.

However, in accordance with the invention, the phone is also able to provide, dynamically, menu information relating to features of the alerter 4. This is achieved by providing both the phone and the alerter with means for supporting a designated protocol for exchanging the required information. In this case, as is described in more detail below, the protocol which is used is the well-known AT protocol.

All features of the phone 2 operate under the control of a central processor 18, and all features of the accessory 4, for example a motor 20 which causes the device to vibrate, operate under the control of a central processor 22.

For as long as the phone 2 is switched on and the alerter 4 remains connected thereto, the phone will store in the memory 14 information relating to a menu item which refers specifically to the alerter. Similarly, if there is more than one accessory connected to the phone, the phone will store in the memory 14 information relating to a menu item which refers specifically to each such accessory.

Then, one of the items in the phone's menu can be a heading "Additional Menus", for example. Selection of this item brings up a list of sub-menu headings, each relating to one accessory which is connected to the phone. Selection of one of those sub-menu headings then brings up a further sub-menu containing a list of items relating to functions of that accessory. The list may contain specific features, or may contain further sub-menu headings.

When required, information relating to an accessory function is thus available for display to the user, in the same way as information relating to functions of the phone. If the menu option is selected by the user, a signal is returned to the accessory, which can then either control the accessory as required, or can send information relating to a sub-menu of accessory functions.

However, to minimise the requirement to store data in the memory 14, data relating for example to sub-menus of accessory functions are not stored in the phone, but rather are supplied dynamically from the accessory to the phone when required. For example, if a user selects an accessory function using the keypad, data relating to the required subsequent LCD display are transmitted at that time from the accessory to the phone.

By contrast, the initial information about the presence of the accessory, available under the heading "Additional Menus", is preferably stored in the phone for as long as the accessory remains connected. This is because data transmission speeds between the phone and the accessories are rather slow (for example 2.4 kbit/s), with the result that the appearance of the items on the "Additional Menus" list would be rather slow if there were several items connected and such information was not stored in the phone but needed to be sent from the respective accessories.

In order to be able to provide this functionality, it is necessary that the phone and each accessory be able to support a common interface updating protocol. As mentioned previously, the protocol used in the illustrated embodiment of the invention is the AT protocol.

It is also necessary to define a number of standard format commands, which allow messages to be passed between the phone and any accessory connected thereto.

The definition of the protcol, and of a number of commands, means that a given accessory can be used to obtain the same functionality with any phone which supports the same protocol. Moreover, it means that any accessory which supports the protocol can obtain the same functionality with a given phone. Thus, the user interface of a phone can be used to control an accessory connected thereto, even if the accessory is one which had not been designed or even thought of at the time of manufacture of the phone.

There will now be described in more detail the commands which are available for communication between the phone and accessories.

In particular, there is described here a method which defines four commands which may be sent from an accessory to a phone, each command instructing the phone to create a particular type of display on its LCD, and being sent from the accessory to the phone with associated information which forms part of the display. Further, the method defines three responses, also sometimes referred to herein as commands, which may be sent from the phone to the accessory, based on user inputs in operation of the menu system.

A first command, which is sent from accessory to phone, is a Menu Creation command. This relates to the creation of a persistent menu item, namely an item which is to be stored in the memory 14 of the phone for as long as the accessory is connected and the phone is switched on. As mentioned above, it is the item which appears under the "Additional Menus" heading.

The command has the defined parameter <persistent menu item text>, which is the menu item text which is to appear under the "Additional Menus" heading.

When the phone receives this command it must: create the additional menu if it is not already present; and add an item with the text specified in the parameter <persistent menu item text>.

A second command, which is sent from accessory to phone, is a Submenu Creation command. This relates to the creation of a dynamic submenu, namely an item which is to be stored in the memory 14 of the phone only when it is being displayed. A dynamic submenu must have a parent menu item, which can be either a persistent menu item which appears under the "Additional Menus" heading or another dynamic submenu.

The command has the defined parameters: <title>, which is the title text which is to appear under the previous menu heading; <next state>, which defines the next required action if the user selects or rejects the submenu item using the function keys (this is described in more detail below); <selected item>, which defines the index of the selected item, that is, the number of the item in the list which is to be shown as selected when the list is first presented to the user for his selection; <number of menu items>, which is the number of items in the submenu; and <menu item>, which is the text for the menu items in the accessory menu.

With regard to the <next state> parameter, there may be a number of options available whether the user accepts or rejects the sub-menu. For example, the phone may return to the persistent menu, it may wait for another submenu, or it may go to the standby screen. For a given submenu, it may be desired to specify the required next action of the phone in response to either of two user inputs, namely accepting and rejecting the submenu. The next action, in each case, may be selected from the three options listed above. This gives a total of nine (=$3^2$) pairs of required next actions. This means that, for any submenu, the <next state> parameter can be a single digit which identifies one of these pairs of next actions, one of which is to be selected if the submenu is accepted, and one of which is to be selected if the submenu is rejected.

A third command, which is sent from accessory to phone, is a Text Creation command. This relates to the creation of a text string, for display to the user. For example, in the case of a mobile phone, the text may appear next to the phone system operator name, or may replace the time display.

The command has the defined parameters <status text>, which is the text which is to appear on the display; and <area>, which is used because different phones will have different areas available for the display of such text messages, and this parameter allows different priorities to be given to different parts of a text message, with only higher priority parts being displayed if the space available is small.

This command is therefore used to display a message which does not require any user response.

A fourth command, which is sent from accessory to phone, is a Dialog Creation command. This relates to the creation of an input dialog, for display to the user, which allows the user to select an option or enter a parameter value.

This command includes a large number of defined parameters, allowing the creation of dialogs in a wide variety of formats, namely: <type>, which indicates the allowed type of input, described in more detail below; <title>, which indicates the header for the input or question; <prompt>, which indicates the text which is to appear before the input; <next state>, which indicates the action required when the user accepts or rejects the dialog, and is described further below; <message text>, which indicates the text which is to appear in the message box; <timeout>, which can be used to indicate a maximum time for which the dialog will remain; <question text>, which indicates text for the question; <default selected>, which indicates a default value if there is no user input selected; <number of list items>, which indicates the number of items in a list; <list item>, which indicates an item in a list; <default on/off>, which indicates a default value in an on-off dialog; <default text>, which indicates text which a user is able to edit; <max real value>, which indicates the maximum real value allowed to be entered; <default real value>, which indicates a real value which a user is able to change; <min value>, which indicates the minimum value which can be accepted; <max value>, which indicates the maximum value which can be accepted; <default value>, which indicates an integer which a user is able to edit; <default number>, which indicates a phone number which a user is able to edit; <percent steps>, which indicates a number of steps in the input dialog; <default percent>, which indicates a start value; <default date>, which indicates a date; <default time>, which indicates a time; <text>, which gives some information text.

Regarding the parameter <type> mentioned above, there may be defined a number of dialog types, defined in terms of the sort of input which is required. For example, <type> parameter value 0 [No dialog] is used when the accessory has no further dialog to send; <type> parameter value 1 [Message Box] informs the user of some information; <type> parameter value 2 [Yes-No Input] asks the user a question; <type> parameter value 3 [On-Off Input] allows the user to select ON or OFF; <type> parameter value 4 [Percent Input] allows the user to select a percentage value, for example for a ring volume; <type> parameter value 5 [One-of-Many Selection] allows the user to select an alternative from a list; <type> parameter value 6 [Real Input] requires selection of a positive real number with optional decimal point; <type> parameter value 7 [Integer Input] requires selection of positive or negative numbers; <type> parameter value 8 [Phone Number Input] requires an input phone number; <type> parameter value 9 [Date Input] requires an input date; <type> parameter value 10 [Time Input] requires an input time; <type> parameter value 11 [String Input] requires a text input; <type> parameter value 12 [Authentication Input Numeric] requires hidden entry of digits; <type> parameter value 13 [Timed Feedback] shows progress of an operation; <type> parameter value 14 [Information] presents the user with a text which can be scrolled and can then accepted by pressing OK.

With regard to the <next state> parameter, as with submenus as described above, there may be a number of options available whether the user accepts or rejects the dialog. For example, the phone may return to the persistent menu, it may wait for another dialog, or it may go to the standby screen. For a given dialog, it may be desired to specify the required next action of the phone in response to either of two user inputs, namely accepting and rejecting the dialog. The next action, in each case, may be selected from the three options listed above. This gives a total of nine (=$3^2$) pairs of required next actions. This means that, for any dialog, the <next state> parameter can be a single digit which identifies one of these pairs of next actions, one of which is to be selected if the dialog is accepted, and one which is to be selected if the dialog is rejected.

A first response, which is sent from the phone to the accessory, is an Additional Indication command. This result code is sent from the phone to the accessory when the user selects the persistent menu item, described above in relation to the Menu Creation command, from the additional menu.

A second response, which is sent from the phone to the accessory, is a Menu Indication command. This command is sent to indicate which item if any the user has selected from a submenu, described above in relation to the Submenu Creation command. It includes the defined parameter <menu item index>, which shows the position of the selected item in the submenu. Thus, the value 1 indicates that the user has selected the first item in the submenu. The value 0 indicates that the user has rejected the submenu.

A third response, which is sent from the phone to the accessory, is an Input Indication command. This command is sent when the user accepts an input dialog, described above in relation to the Dialog Creation command. The command includes a <type> parameter corresponding to the <type> parameter of the Dialog Creation command, which is sent to the accessory together with the user input. For example, if the dialog is of a type which requires the user to enter text, the Input Indication command includes a <type> parameter to indicate this, and is sent together with the text entered.

Figure 3:
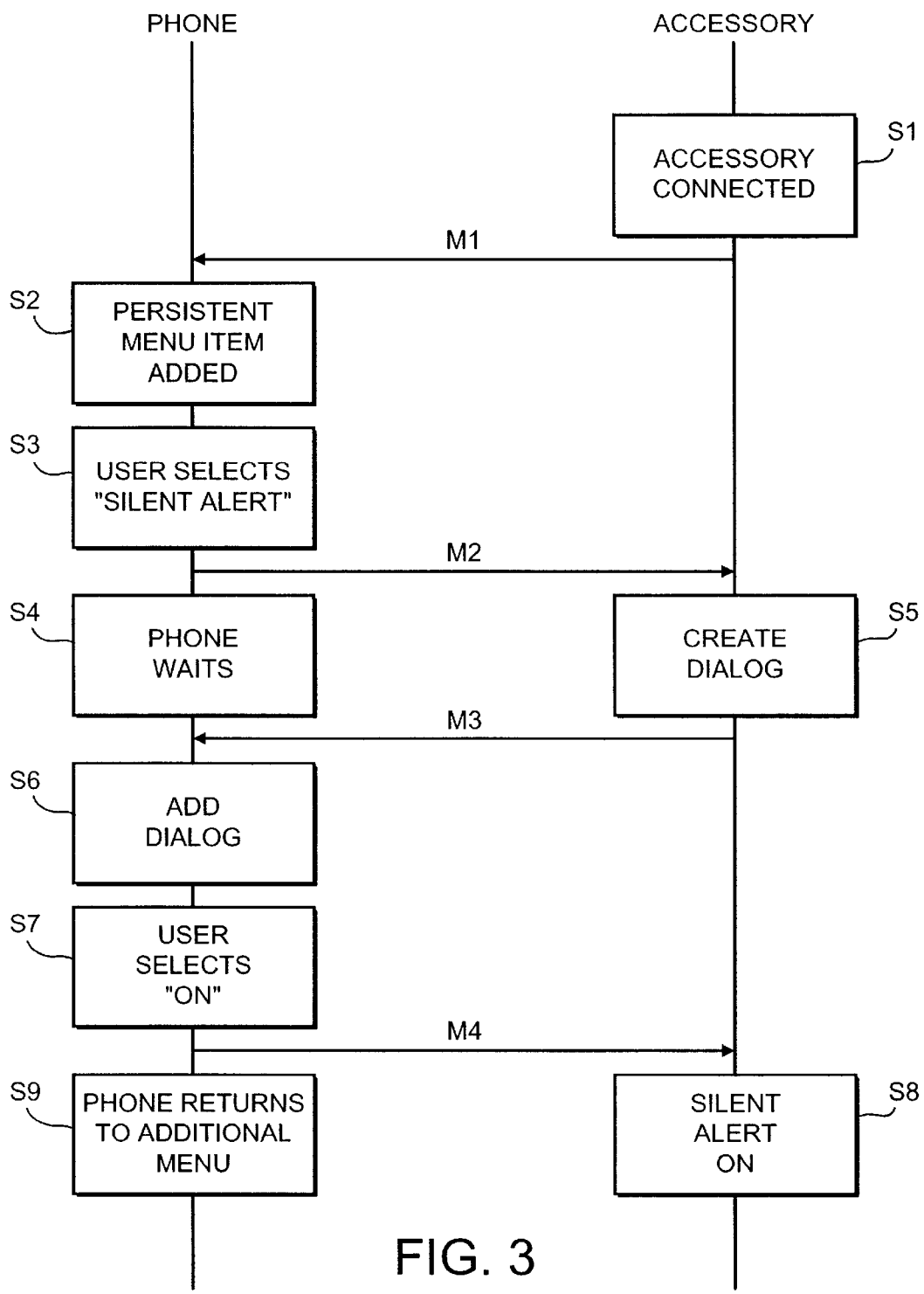
FIG. 3 is a flow chart showing a first exemplary operation in accordance with the invention.

FIG. 3 is a first flow chart, showing the progress of an operation in which an accessory is connected to a phone and controlled.

In step S1 of the operation, the accessory, in this case a silent vibratory alerter, is connected to the phone, and sends a Menu Creation command M1, with the parameter "Silent Alert". In step S2 of the operation, the phone stores this item in its memory, and adds a persistent memory item with the text "Silent Alert" to its menu structure.

In step S3 of the operation, the user selects the item "Silent Alert" from the menu, and the phone sends an Additional Indication response M2 indicating that the persistent menu has been selected.

The phone then waits in step S4 for further information to be sent from the accessory. As mentioned previously, no further information relating to the accessory is stored in the phone at this stage, in order to provide maximum flexibility for the accessory to obtain whatever control inputs it requires, and in order to minimise the demands made on the phone's memory.

In step S5, the accessory sends a Dialog Creation command M3, which contains parameters which indicate that the dialog is of a type which requires an on/off selection, that the dialog header text is to read "Silent Alert", that the default value (either ON or OFF) which is to be presented when the dialog appears on the display, and that the next state is to return to the persistent menu whether this dialog is accepted or rejected.

In step S6, the phone creates and displays the required dialog, and, in step S7, the user selects ON, and the phone sends an Input Indication response M4 to the accessory.

On receipt of this command, the accessory switches the silent alerter ON in step S8, and the phone returns to the persistent menu in step S9, in accordance with the <next state> parameter in the Dialog Creation command. Thus, at this stage, the phone no longer needs to store any data relating to details of the menu structure for the silent alerter, and retains only the original persistent menu item indication.

Figure 4:
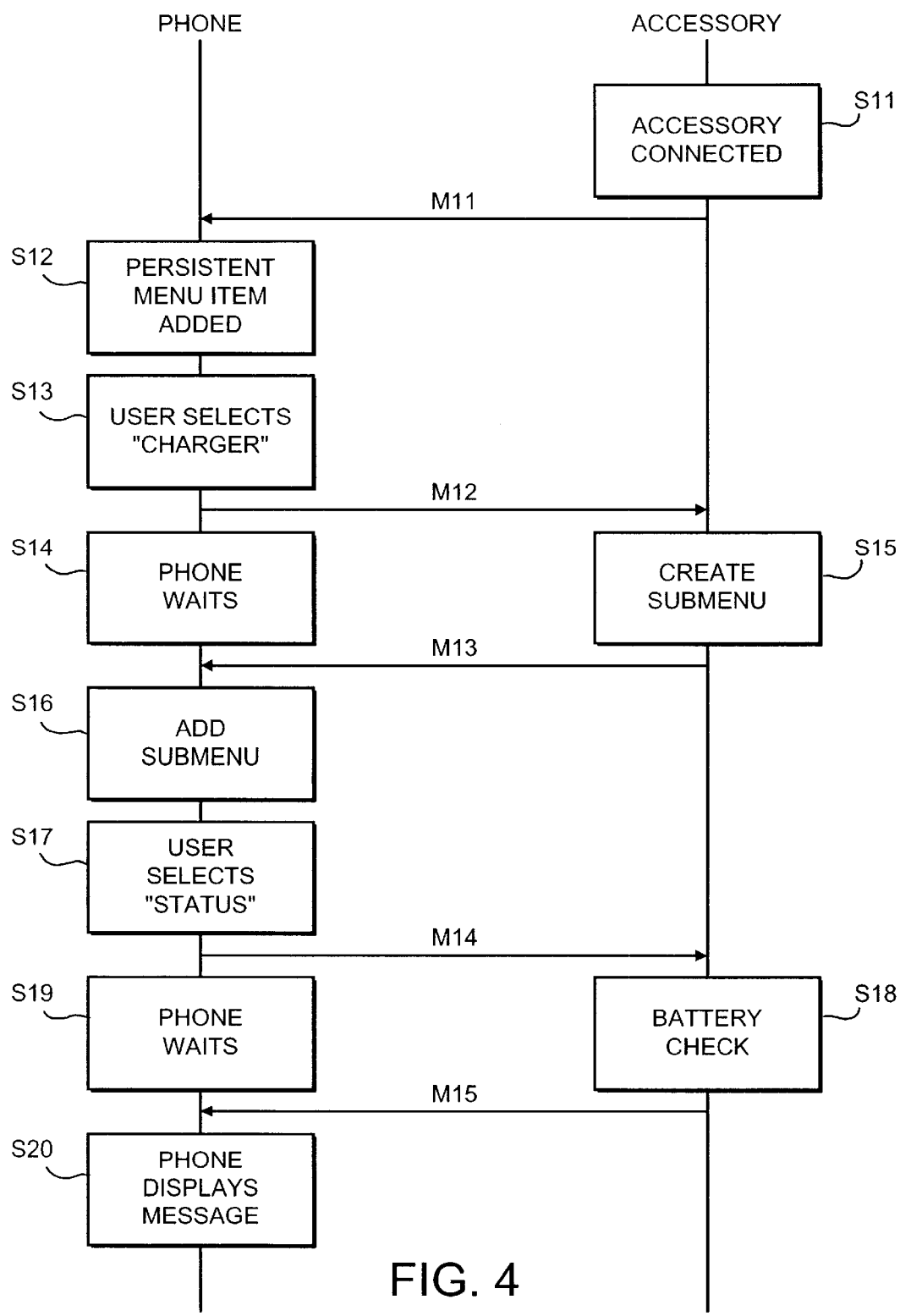
FIG. 4 is a flow chart showing a second exemplary operation in accordance with the invention.

FIG. 4 is a second flow chart, showing the progress of an operation in which an accessory provides information to a user by means of the phone's display. In particular, a battery charger, connected to a phone, uses the phone's display to indicate the status of the battery.

In step S11 of the operation, the accessory, in this case the battery charger, is connected to the phone, and sends a Menu Creation command M11, with the parameter "Charger". In step S12 of the operation, the phone stores this item in its memory, and adds a persistent memory item with the text "Charger" to its menu structure.

In this case, if, for example, a silent alerter is also connected to the phone, a persistent memory item with the text "Silent Alert" will also be present in the menu structure.

In step S13 of the operation, the user selects the item "Charger" from the menu, and the phone sends an Additional Indication response M12 indicating that the persistent menu has been selected.

The phone then waits in step S14 for further information to be sent from the accessory. As mentioned previously, no further information relating to the accessory is stored in the phone at this stage.

In step S15, the accessory sends a Submenu Creation command M13, which contains parameters which indicate that the submenu header text is to read "Charger", that the features listed in the submenu are to be titled "Status" and "Settings", and that the next state is to wait for further information from the accessory if this submenu is accepted or to return to the persistent menu if it is rejected.

In step S16, the phone creates and displays the required submenu, and, in step S17, the user selects the heading "Status". The phone then sends a Menu Indication response M14 to the accessory, indicating that the selected option is the first item in the submenu.

On receipt of this command, the accessory checks the status of the battery in step S18, while the phone waits for further information in step S19, in accordance with the <next state> parameter in the Submenu Creation command. Thus, at this stage, the phone no longer needs to store any data relating to details of the menu structure for the charger, and retains only the original persistent menu item indication.

On completion of the battery status check in step S18, the accessory sends a Dialog Creation command M15, including parameters which indicate that the next state is to await a further input, that the dialog is a message box, requiring no user input, that the header text is "Battery Status", and that the text message is, for example, "85% charged".

In step S20, the phone displays the message box, and awaits a further input in accordance with the <next state> parameter of the Dialog Creation command.

There is therefore described a method, and devices, which allow accessories without user interfaces to communicate with a user through the user interface of a base device. Moreover, this can be achieved without placing excessive requirements on the base device, and without requiring the base device to have previous knowledge of the accessory.

What is claimed is:

1. A mobile communications device comprising:
    a user interface;
    a processor;
    a memory;
    wherein the memory is adapted to store menu information relating to operating features of the mobile communications device for output to a user;
    wherein the processor is adapted to control the mobile communications device to act on responses to the menu information supplied via the user interface;
    wherein, when the device has at least one accessory connected thereto, the memory temporarily stores sufficient additional menu information for each of the at least one accessory, to allow output to the user of a list of said at least one accessory,
    wherein, when a user selects a first of said at least one accessory from said list via the user interface, the device is adapted to:
    retrieve from the first accessory further additional menu information relating to a sub-menu;
    output the sub-menu to the user; and
    temporarily store said further additional menu information; and
    wherein the device sends signals to the accessory, said signals causing said accessory to act on responses supplied via the user interface.

2. The mobile communications device as claimed in claim 1, wherein the user interface comprises:
    a keypad for user inputs; and
    a display.

3. The mobile communications device as claimed in claim 1, wherein the device supports the AT protocol for communication with accessories.

4. An accessory for use with a mobile communications device and having no user interface, the accessory comprising:
  a processor;
  a memory for storing additional menu information relating to the accessory;
  wherein, when the accessory is connected to a mobile communications device, the accessory is adapted to send additional menu information to the mobile communications device, the additional menu information serving to identify the accessory in a menu to be displayed to a user; and
  wherein the accessory, when the accessory receives a signal from the mobile communications device indicating that the accessory has been selected from said menu, is adapted to send further additional sub-menu information to the mobile communications device, the further additional sub-menu information serving to cause information relating to functions of the accessory to be displayed to the user.

5. The accessory as claimed in claim 4, wherein the accessory is a non-wired accessory.

6. The accessory as claimed in claim 4, wherein, depending on the further additional sub-menu information to which the mobile communications device is responding, the accessory can act on signals received from the mobile communications device by:
  sending still-further additional sub-menu information to the mobile communications device, the still-further additional sub-menu information serving to cause information relating to further functions of the accessory to be displayed to the user; or
  controlling the operation of said accessory.

7. The accessory as claimed in claim 4, wherein the accessory supports the AT protocol for communication with the mobile communications device.

8. A method of creating a user menu in a mobile communications device having an accessory connected thereto, the mobile communications device having a user interface comprising an input device and an output device, a memory for storing menu information for output to a user, and a processor for controlling the device to act on responses to the menu information supplied via the input device, the method comprising:
  providing menu information to a user relating to operating features of the mobile communications device;
  controlling the mobile communications device to act on responses to the menu information supplied via the user interface;
  receiving additional menu information from an accessory connected to a mobile communications device;
  temporarily storing sufficient additional menu information for each accessory connected to the mobile communications device to allow a list of such accessories to be supplied to the user;
  in response to selection by the user of said accessory from said list of accessories, sending from the accessory to the mobile communications device commands relating to further additional sub-menu information;
  temporarily storing the further additional sub-menu information relating to said accessory;
  supplying to the user a sub-menu based on said commands; and
  sending command signals to the accessory, said command signals causing the accessory to act on user responses to the further additional sub-menu information.

9. The method as claimed in claim 8, further comprising storing the further additional sub-menu information only while said information is required for provision to the user.

10. The method as claimed in claim 8, wherein signals and additional menu information are exchanged between the mobile communications device and accessory using the AT protocol.

11. A method of creating a user menu in a mobile communications device having an accessory connected thereto, a user interface comprising an input device and an output device, a memory for storing menu information for output to a user, and a processor for controlling the device to act on responses to the menu information supplied via the input device, the method comprising:
  providing menu information to a user relating to operating features of the mobile communications device;
  controlling the mobile communications device to act on responses to the menu information supplied via the user interface;
  when at least one accessory is connected to the mobile communications device, receiving additional menu information therefrom and temporarily storing sufficient additional menu information for each accessory connected to the mobile communications device to supply to the user a list of each accessory connected to the device;
  in response to a selected user input via the user interface, sending from a first accessory to the mobile communications device a command relating to the creation of an input dialog;
  in response to the receipt by the mobile communications device of the command relating to the creation of an input dialog, supplying, to the user via the user interface, a dialog output, the dialog input indicating an operating parameter of the accessory;
  accepting a user input via the user interface, relating to a user-selected value for said operating parameter; and
  sending command signals to the first accessory to control operation of the first accessory in response to the user-selected value for said operating parameter.

* * * * *